Figure 1:
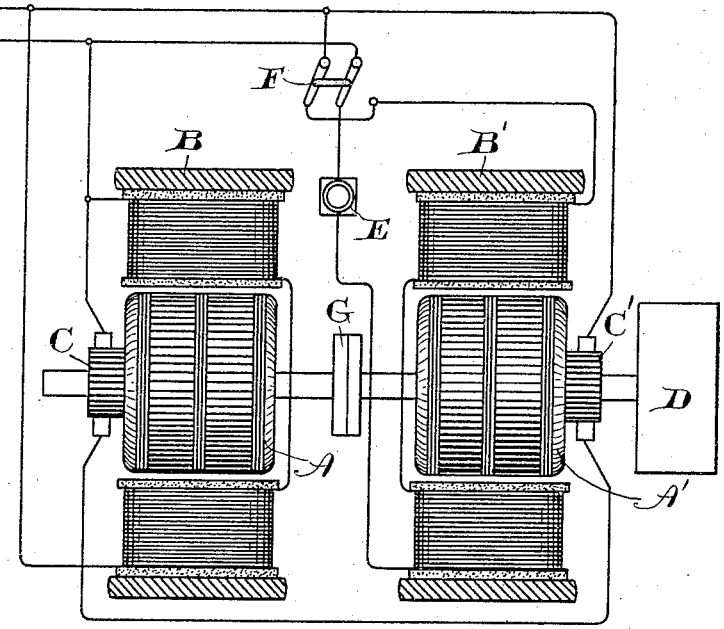

(No Model.)

J. BURKE.
REGULATING ELECTRIC MOTORS.

No. 557,185. Patented Mar. 31, 1896.

WITNESSES
A. F. Macdonald.
B. B. Hull

INVENTOR
James Burke, by
Geo. R. Blodgett,
Atty.

ANDREW B. GRAHAM. PHOTO-LITHO. WASHINGTON, D.C.

UNITED STATES PATENT OFFICE.

JAMES BURKE, OF NEWARK, NEW JERSEY, ASSIGNOR TO THE GENERAL ELECTRIC COMPANY, OF NEW YORK.

REGULATING ELECTRIC MOTORS.

SPECIFICATION forming part of Letters Patent No. 557,185, dated March 31, 1896.

Application filed September 4, 1895. Serial No. 561,389. (No model.)

*To all whom it may concern:*

Be it known that I, JAMES BURKE, a subject of the Queen of Great Britain, residing at Newark, county of Essex, State of New Jersey, have invented certain new and useful Improvements in Regulating Electric Motors, (Case No. 280,) of which the following is a specification.

My invention relates to the regulation of electric motors, and has for its object to effect this regulation in a more efficient manner than that heretofore practiced, and at the same time to obtain a wider variation of speed and torque than by methods commonly in use.

To the ends pointed out I dispense with the ordinary resistances in series with the motor; and I effect the regulation by energizing the motor by the resultant of two independent coöperating electromotive forces, the one (that of the main motor) being always a counter electromotive force, the other being either an additional counter electromotive force or an assisting electromotive force, with reference to the main motor, and then varying the value and direction of the second force. I may employ for the purposes of my invention any form of machine now standard in the art, of any ordinary construction of armature-winding, and with the fields excited by any of the methods now well known or by any combination of them, these features being unessential and capable of being varied at will.

Briefly, my improvement in the art of regulation consists, as above stated, in utilizing an auxiliary electromotive force either to oppose the line potential as delivered to the motor or to assist the line potential, and thus to obtain from the motor higher speeds than that possible where the full-line voltage is the limit of that delivered to its terminals; and the improved means which I have devised for carrying out my invention consists in a main motor and an auxiliary dynamo-electric machine so arranged as to run in unison with the main motor, with means for changing the field strength of this second machine from zero to a maximum predetermined and also means for reversing the field of the machine, and for then varying the field strength, as just described, but in the reverse direction, so that the electromotive force of the auxiliary machine may be varied from maximum in one direction to maximum in the other direction, and thus may be either a maximum counter electromotive force tending to reduce the speed of the motor and to assist its torque, or a maximum assisting electromotive force tending to obtain with the motor speeds greater than that due to the normal line potential with a corresponding reduction of torque.

Figure 2:
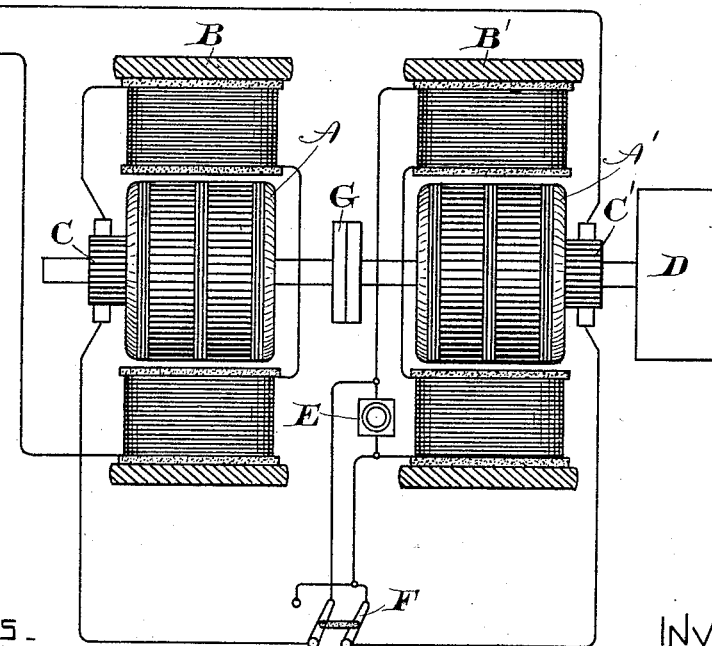

The accompanying drawings show diagrammatic embodiments of my invention, Figure 1 representing it as applied to shunt-wound field-magnets, and Fig. 2 as using series machines.

In Fig. 1, $a\,b$ are the mains between which any suitable difference of potential is maintained, supplied by any suitable source of electromotive force.

B B' are the machines, represented as of the same size, although this is not an essential feature.

A A' are the armatures. (Shown in the drawings as mounted upon the same shaft or upon shafts connected by a suitable coupling G.)

D is the pulley to which power is communicated by the rotation of the motor.

C C' are the commutators provided with suitable brushes.

E is a rheostat or field-regulating resistance, and F is a reversing-switch affecting only the field of the dynamo-electric machine B'. The resistance E is in Fig. 1 shown in series with the shunt-wound field of the machine B', while in Fig. 2 it is shown as in shunt to the series field, the difference and the reasons therefor being well understood by those skilled in the art.

It is of course to be understood that the mains $a\,b$ are supplied at constant potential.

The coupling G may be of any type, and the same purpose may be effected by any form of coupling, mechanical or electrical, which will compel the two armatures to rotate in unison.

The various steps of control and regulation attainable with my invention are substantially as follows: In starting, the fields of the two machines B B' are of maximum strength and the field of B' is in such a direction that the two machines both run as motors with their armatures in series. The voltage of the mains $a\,b$ is thus divided between B and B', thus bringing down the speed to a minimum, and the torque per unit of current of the two machines acting as mechanically-coupled motors to a maximum, as in the ordinary case of two motors coupled in series. The field of the machine B' is now gradually reduced by manipulation of the rheostat E until it reaches zero, or approximately so. The voltage across the motor B has now reached that due to the difference of potential between the mains $a\,b$, and the speed has increased to that of a single motor, or the same as that of two motors if they were run in parallel, but the torque is that due only to the motor B running alone. The next step in the control is to throw the reversing-switch F. With the field of B' at zero this step in itself produces no result; but upon increasing the strength of the field of B' from zero to maximum in the reverse direction the voltage across the motor B becomes that due to the difference of potential between the mains $a\,b$ plus whatever electromotive force is generated in the armature A' rotated by the motor B, and the speed increases above that due to the voltage across the mains $a\,b$ in proportion to this increased voltage delivered to the motor B; but the torque is now that due to the motor B less the power required to drive the machine B' as a generator, and the speed increases and the torque diminishes until the field of the machine B' is at its maximum, the excess in voltage across B above that of the mains through this part of the operation being equal to the voltage supplied by the machine B', driven by the motor B.

In each of the cases considered the drop due to resistance of the various circuits has been neglected in stating the result attained.

Reversal of rotation may be effected in any of the ways well known in the art, as by reversing either both of the fields or both of the armature-circuits; or any equivalent means may be employed.

What I claim as new, and desire to secure by Letters Patent of the United States, is—

1. The combination of a motor operated from a constant-potential circuit, another dynamo-electric machine coupled mechanically to the motor, the armatures of the two machines being in series, and a switch and rheostat for varying and reversing the field of the additional dynamo.

2. The combination of a constant-potential circuit, two dynamo-electric machines with their armatures in series across the circuit and connected so as to rotate in unison, and a switch and resistance for reversing and varying the field of one of the dynamo-machines to regulate the speed and torque of the combination.

3. The combination of a constant-potential circuit, two dynamo-machines, their armatures in series and mechanically coupled, and a switch and rheostat for reversing and varying the field of one of the dynamo-machines from maximum in one direction to maximum in the other, and thereby regulating the resultant speed and torque.

In witness whereof I have hereunto set my hand this 31st day of August, 1895.

JAMES BURKE.

Witnesses:
LAMAR LYNDON,
SAM SAGERTOF.